United States Patent
Yaver

(10) Patent No.: US 8,337,971 B2
(45) Date of Patent: Dec. 25, 2012

(54) IMPACT PADS AND A PROCESS FOR MANUFACTRING THE SAME

(75) Inventor: Imam Syed Yaver, West Bengal (IN)

(73) Assignee: Tega Industries Limited, Kolkata (IN)

( * ) Notice: Subject to any disclaimer, the term of this patent is extended or adjusted under 35 U.S.C. 154(b) by 635 days.

(21) Appl. No.: 11/919,174

(22) PCT Filed: Jun. 13, 2006

(86) PCT No.: PCT/IN2006/000197
§ 371 (c)(1),
(2), (4) Date: Jul. 22, 2009

(87) PCT Pub. No.: WO2007/054959
PCT Pub. Date: May 18, 2007

(65) Prior Publication Data
US 2009/0280288 A1  Nov. 12, 2009

(30) Foreign Application Priority Data
Nov. 8, 2005 (IN) .......................... 1017/KOL/2005

(51) Int. Cl.
*F16F 7/00* (2006.01)
*B32B 3/06* (2006.01)
*B32B 3/30* (2006.01)

(52) U.S. Cl. ....... 428/99; 428/119; 428/167; 248/345.1; 293/120

(58) Field of Classification Search .................... 428/99, 428/119, 167; 248/345.1; 293/120, 121, 293/155
See application file for complete search history.

(56) References Cited

U.S. PATENT DOCUMENTS

| | | | |
|---|---|---|---|
| 3,777,438 A | 12/1973 | Brown | |
| 3,843,475 A * | 10/1974 | Kent | 428/35.8 |
| 4,386,799 A * | 6/1983 | Molnar | 293/120 |
| 4,932,516 A | 6/1990 | Andersson | |
| 5,038,924 A | 8/1991 | Stoll | |
| 5,810,406 A * | 9/1998 | Reid et al. | 293/128 |
| 2005/0005565 A1 | 1/2005 | McSharry et al. | |

FOREIGN PATENT DOCUMENTS

| | | |
|---|---|---|
| EP | 0 418 735 B1 | 1/1994 |
| FR | 2 754 553 A | 4/1998 |
| GB | 2 223 823 A | 4/1990 |
| WO | WO 02/40779 A | 5/2002 |

OTHER PUBLICATIONS

International Search Report dated Dec. 20, 2006, issued in PCT IN2006/000197.

* cited by examiner

*Primary Examiner* — Alexander Thomas
(74) *Attorney, Agent, or Firm* — Venable LLP; Robert Kinberg

(57) ABSTRACT

An impact pad comprising an upper part, a middle part, and a lower part, the said upper part being configured as a single piece with a plurality of protrusions on a under side there of facing the middle part, such that said protrusions are adapted to fit in the grooves provided on the top surface of the middle part, the bottom surface of the middle part being provided with the third part, namely means for fastening impact pads on the main support frame with clamps.

8 Claims, 4 Drawing Sheets

IMPACT PADS AND A PROCESS FOR MANUFACTRING THE SAME

FIELD OF THE INVENTION

The invention relates to impact pads and a process for manufacturing the same.

BACKGROUND OF THE INVENTION AND PRIOR ART

Impact pads are known to comprise of fusion of three different parts/layers, an upper part/layer made of Ultra High Molecular Weight Polyethylene (UHMWPE). The middle part/layer is of rubber while the lower part/layer is for fastening impact pads on the main support frame with clamps.

The fusion of three parts/layers is done by hot vulcanized process in a press. The moulds of different sizes are used in the above process to get the desired product.

However, the existing product has the tendency of bending on both sides of the impact pads due to differential shrinkage of Polymer, Rubber and Reinforcements.

Further, in the event that any of the part/layers wears out, the entire pad has to be discarded or changed. Also the pads are not cost-effective, as they are manufactured by fusion of the three layers which is time-consuming.

OBJECTS OF THE INVENTION

It is therefore an object of this invention to propose impact pads with a novel fixing system.

It is a further object of this invention to propose impact pads having shapes and sizes, which can be varied according to requirement.

These and other objects of the invention will apparent from the ensuing description when read in conjunction with the accompanying drawings.

BRIEF STATEMENT OF THE INVENTION

Thus according to this invention is provided an impact pad comprising an upper part, a middle part, and a lower part, the said upper part being configured as a single piece with a plurality of protrusions on a under side there of facing the middle part, such that said protrusions are adapted to fit in to the grooves provided on the top surface of the middle part, the bottom surface of the middle part being provided with the third part, namely means for fastening impact pads on the main support frame with clamps.

This fastening arrangements is unique. The push fit arrangement can have different geometrical shapes and design with similarly matching portion in rubber to fitting method by simple pushing.

The middle part/layer as shown in the drawing forms a slotted design and push fit with upper part/layer is unique and can have different geometrical shapes and design with similarly matching on the upper part/layer and process of fitting by push fit.

The upper part/layer is made of material such as ultra high molecular weight polyethylene (UHMWPE) and the middle part/layer is made of Rubber. The lower part/layer has clamping arrangement for fastening the impact pad on the main support frame.

In preferred embodiments according to the invention, the impact pads are manufactured in different lengths, thickness and shapes according to the particular requirement and all such embodiments are within the scope of the instant application.

In an optional embodiment, adhesive may be used between the upper and middle layer.

BRIEF DESCRIPTION OF THE ACCOMPANYING DRAWINGS

The invention is now described with reference to the accompanying drawings in which.

DETAILED DESCRIPTION OF THE FIGURES OF THE ACCOMPANYING DRAWINGS

FIG. no 1 shows an isometric view of the impact pad (1) of the invention. It has three parts, namely an upper part (2), middle part (3) and lower part (4).

The upper part is made of material such as ultra high molecular weight polyethylene. (UHMPE).

As seen from a preferred embodiment of the drawings, the top surface of the upper part is slightly curved, (2A) and the under surface has two downwardly extending lugs, (2B, 2B).

These lugs are adapted to snugly fit into the corresponding grooves (3A), on the upper part of the middle part (3). The middle part is made of rubber.

The number of the grooves correspond to the number, shape and configuration of the downwardly extending lugs of the upper part. However, two lugs and the two complementary grooves are preferred for a proper fitting.

Figure 1:
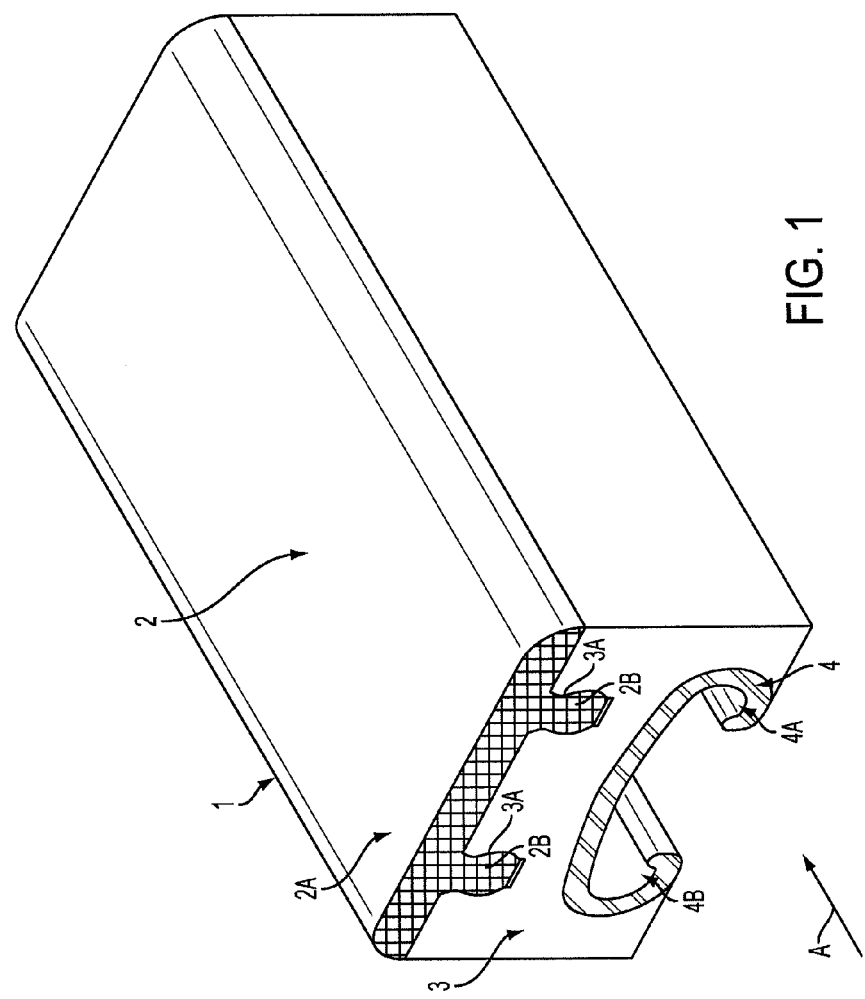
FIG. 1 shows fragmentary isometric view of the proposed pads giving details and view of upper part, middle part and lower part.
Figure 2:
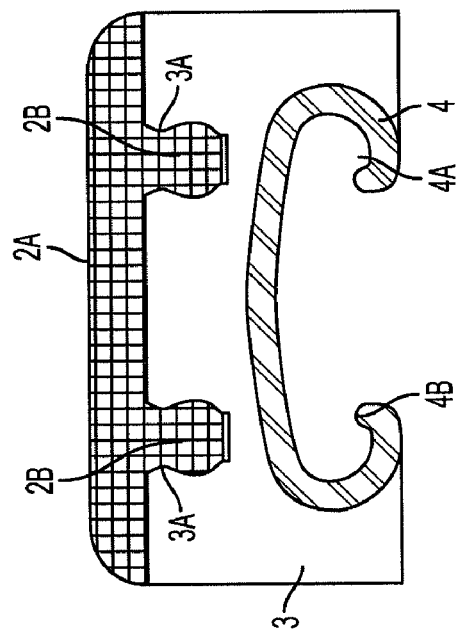
FIG. 2 shows front view of the impact pad along the arrow A shown in FIG. 1.
Figure 3:
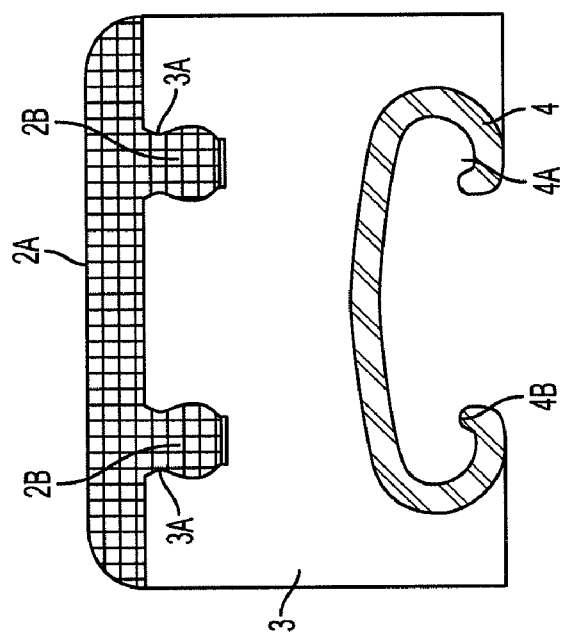
FIG. 3 shows the front view of the impact pad shown in FIG. 2.
Figure 4A:
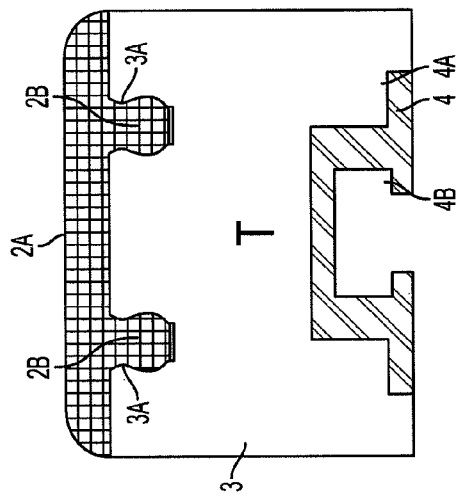
FIGS. 4a to 4d show various types of the lower part namely the clamp arrangements used with different lengths and thickness.
Figure 4B:
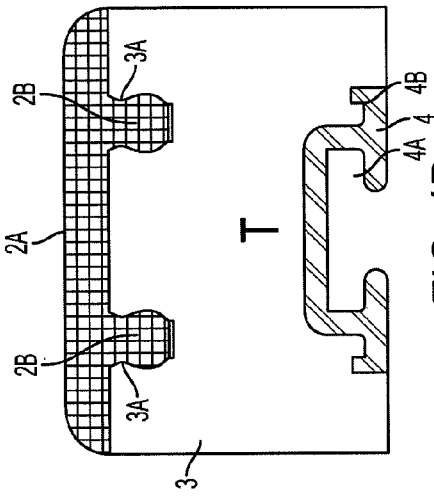
Figure 4C:
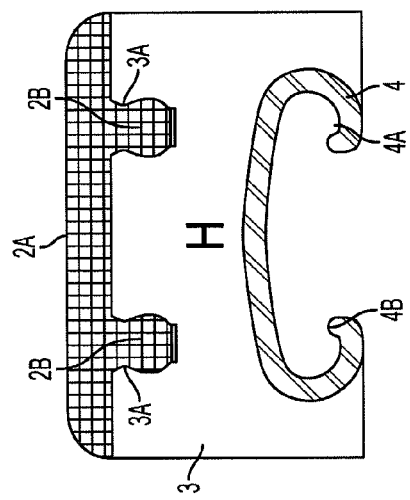
Figure 4D:
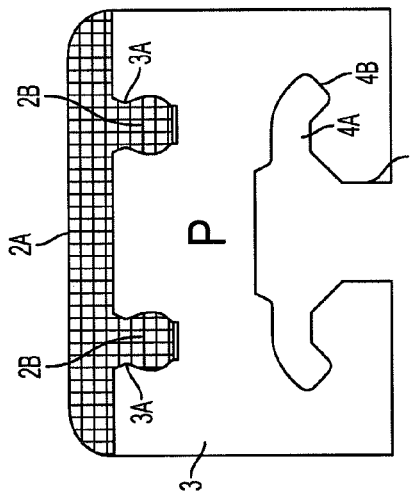
Figure 5:
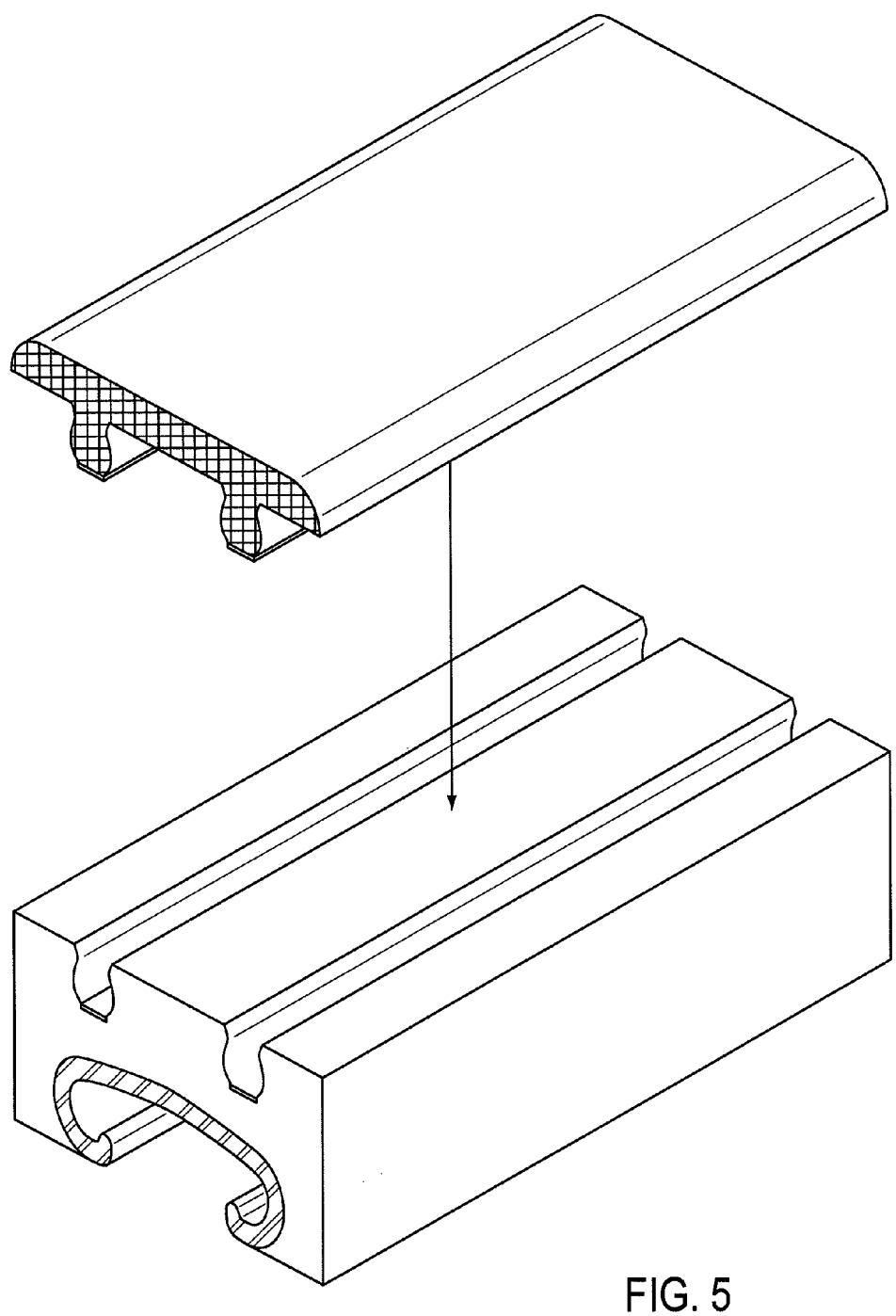
FIG. 5 shows two segments of the proposed impact Pads.

The lower part, (4) is the fastening means for fastening the impact pad on to the main support frame. It has longitudinal grooves (4A) and (4B) and can be of any convenient shape as shown in FIGS. 1, 2, 3, 4a 4b, 4c and 4d.

The different parts are preferably made separately assembled by a unique push-fit action.

If any one or more part/s is/are damaged, this can be easily replaced without having to discard the whole pad.

This saves cost and time and is also economical.

I claim:
1. An impact pad comprising:
   an upper part;
   a middle part coupleable to the upper part; and
   a lower part coupleable to the middle part,
   wherein the upper part comprises a single piece with at least two spaced-apart lugs on an under side thereof facing the middle part,
   wherein the middle part comprises a single piece with at least two spaced-apart grooves provided on a top surface thereof facing the upper part and positioned with respect to the at least two spaced-apart lugs,
   wherein the lugs of the upper part are adapted to be pushed and to fit into the grooves of the middle part in a push fit arrangement, and wherein the lower part comprises a single piece including a clamping arrangement to fasten the impact pad on a main support frame to pad impact.

2. The impact pad of claim 1, wherein an upper side of the upper part is curved.

3. The impact pad of claim 1, wherein the push fit arrangement has different geometrical shapes and designs.

4. The impact pad of claim 1, wherein the upper part is made of Ultra High Molecular Weight Poly Ethylene (UHMWPE) and the middle part is made of rubber.

5. The impact pad of claim 1, wherein the impact pad is manufacturable in different lengths, thickness and shapes.

6. The impact pad of claim 1, further comprising adhesive positioned between the upper part and the middle part.

7. The impact pad of claim 1, wherein the clamping arrangement comprises two longitudinal grooves on a bottom surface of the lower part.

8. The impact pad of claim 1, wherein the upper part comprises a single piece consisting of two spaced-apart lugs, wherein the middle part comprises a single piece consisting of two spaced-apart grooves, and wherein the two spaced-apart lugs of the upper part are adapted to be pushed and to fit into the two spaced-apart grooves of the middle part.

* * * * *